US006791627B2

(12) United States Patent
Bhat

(10) Patent No.: US 6,791,627 B2
(45) Date of Patent: Sep. 14, 2004

(54) TELEVISION SIGNAL RECEIVER

(75) Inventor: Janardhana Bhat, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 439 days.

(21) Appl. No.: 09/891,451

(22) Filed: Jun. 26, 2001

(65) Prior Publication Data

US 2002/0012074 A1 Jan. 31, 2002

(30) Foreign Application Priority Data

Jun. 29, 2000 (WO) .............................. PCT/SG00/00089

(51) Int. Cl.[7] .............................................. H04N 5/62
(52) U.S. Cl. ...................................... 348/737; 348/736
(58) Field of Search ................................. 348/736–738, 348/725, 726; 455/307, 311, 315, 208; H04N 5/62

(56) References Cited

U.S. PATENT DOCUMENTS

| 4,271,433 A | | 6/1981 | Theriault ................. 358/191.1 |
| 4,316,220 A | | 2/1982 | Muterspaugh et al. ...... 358/196 |
| 4,490,743 A | * | 12/1984 | Mycynek et al. ........... 348/737 |
| 4,639,786 A | * | 1/1987 | Tamer et al. ............... 348/737 |
| 5,256,980 A | * | 10/1993 | Itri ............................. 327/105 |
| 5,483,297 A | * | 1/1996 | Song ......................... 348/737 |
| 5,710,993 A | | 1/1998 | Brekelmans ............. 455/188.1 |
| 5,995,169 A | * | 11/1999 | Hatano ....................... 348/726 |

FOREIGN PATENT DOCUMENTS

| WO | WO9639778 | 12/1996 | ............ H04N/7/20 |
| WO | WO9905861 | 1/1999 | .......... H04N/5/455 |
| WO | WO9905796 | 2/1999 | ............ H04B/1/16 |

* cited by examiner

*Primary Examiner*—Michael H. Lee

(57) ABSTRACT

In a television signal receiver for receiving and processing television signals (RF) that comprise modulated video signals and modulated audio signals, a tuner (16) receives selected television signals and furnishes at least intermediate frequency (IF) signals, a SAW filter (17) is connected to the tuner (16), a video demodulator (18) demodulates the video signals from the SAW filter (17) to obtain demodulated video signals for further processing, a generator (16) supplies signals (SIF) comprising the modulated audio signals on a carrier frequency equal to the difference between a carrier frequency of the modulated video signals and a carrier frequency of the modulated audio signals in the television signals, an audio demodulator (5) demodulates audio signals from the signals (SIF) from the generator (16) to obtain demodulated audio signals for further processing. According to the invention, the generator (16) is connected with the tuner (16) and the audio demodulator (5) is connected with the generator (16).

9 Claims, 2 Drawing Sheets

TELEVISION SIGNAL RECEIVER

Figure 1:
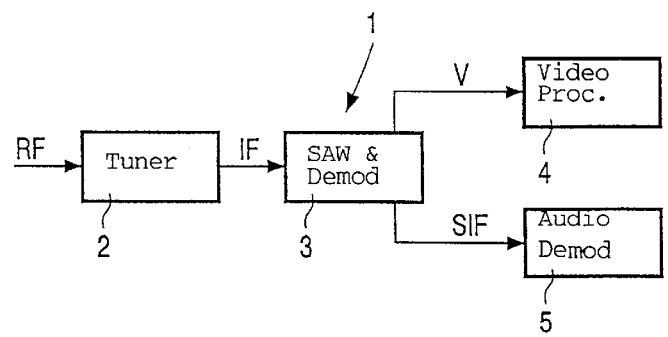

The present invention relates to a television signal receiver method and device for receiving and processing television signals (RF) that comprises modulated video signals and modulated audio signals, the receiver comprising a tuner for input of selected television signals and output of at least intermediate frequency (IF) signals; filters; and demodulators for obtaining audio signals and video signals for further processing, e.g. for display of a picture with sound corresponding with the television signals. The known television signal receivers are described hereafter in more detail.

Generally, two types of processing are known for processing the IF signals from the tuner. These methods are known in the art as intercarrier SIF processing and QSS SIF processing. SIF stands for Sound IF, more specifically the FM modulated sound subcarrier signal. QSS stands for quasi split sound.

As will be described below in intercarrier SIF processing, the IF signal from the tuner is subjected to a video and sound SAW filter, followed by a demodulator, which also outputs SIF signals. The SIF signals comprise modulated audio signals on a carrier frequency, which is equal to the difference between a carrier frequency of the modulated video signals and a carrier frequency of the modulated audio signals in the original television signal. An audio demodulator subsequently demodulates the SIF signals to obtain demodulated audio signals.

Although this known art is relatively economical as a result of the low degree of complexity, the sound sensitivity in such a known system is poor. Further, when the demodulator for demodulating the IF signal subjected to the video and sound SAW filter, is accompanied by an IF amplifier, intermodulation occurs, thereby lowering the quality of at least the sound accompanying a picture, or even the picture itself, when displaying images corresponding with the television signals. This intermodulation in the IF amplifier, accompanying the demodulator, results from the difference between the carrier frequency for the audio signals and the color carrier frequency for the video signals, which difference frequency depends on the television signal standard adopted for the television signals concerned.

According to QSS SIF processing, the IF signal from the tuner is, in parallel, subjected to both a video SAW filter with audio attenuation and an audio SAW filter with video attenuation, each followed by a demodulator for video and audio, respectively. In such a QSS SIF configuration a quality of both video and audio can be maintained at a high standard, but only at considerable costs, as an additional SAW filter, amplifier and demodulator for audio IF signals are required.

Notwithstanding the high costs associated with the QSS SIF processing, implementation thereof is desirable, not only because of the poor sound sensitivity and/or even picture deterioration associated with intercarrier SIF processing, but also because increasingly cable networks are taken into operation, which cable networks do not follow established cable standards. In such cable networks, which do not follow established standards, the intermodulation disturbance associated with the intercarrier SIF concept, which results in intermodulation of the carriers of video, more especially chrominance, signals and audio signals leads to a considerable deterioration in the sound quality or even the picture quality.

It is therefore an object of the present invention to provide a television signal receiver, in which the above stated disadvantages are overcome or at least diminished, to which end a television signal receiver according to claim 1 is provided. Advantageous embodiments are defined in the dependent claims.

In a television signal receiver according to the present invention well filtered and amplified SIF audio signals can be obtained, to be demodulated thereafter, where these SIF audio signals are of a quality, which is comparable with that of the conventional QSS SIF processing, while the high costs associated with this conventional QSS SIF processing are avoided, as no additional audio SAW filter for IF signals is required. Simultaneously the audio quality and even the picture quality can be enhanced in relation to the conventional intercarrier SIF processing, while also an adequate solution is provided for cable networks, which do not follow established standards.

Preferably the television signal receiver according to the present invention is such, that the tuner and the generator form a unit. In such a way the tuner/generator provides not only the IF signal, but simultaneously also the SIF signals, whereby a further simplified configuration can be obtained. Nonetheless, the generator and the tuner can be separate components.

Further preferred embodiments are defined in the dependent claims, including optional configurations for the generator.

These and other aspects of the invention will be apparent from and elucidated with reference to the embodiments described hereinafter.

Figure 2:
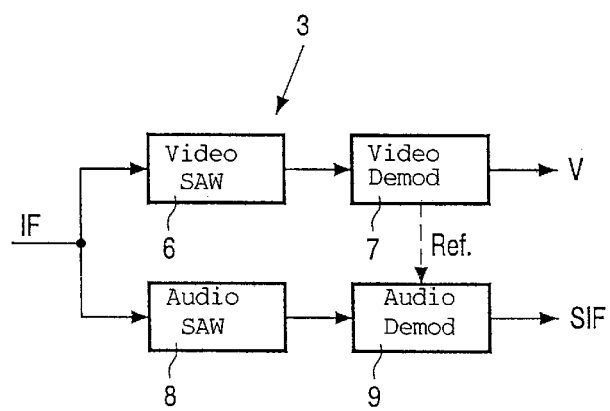
Figure 3:
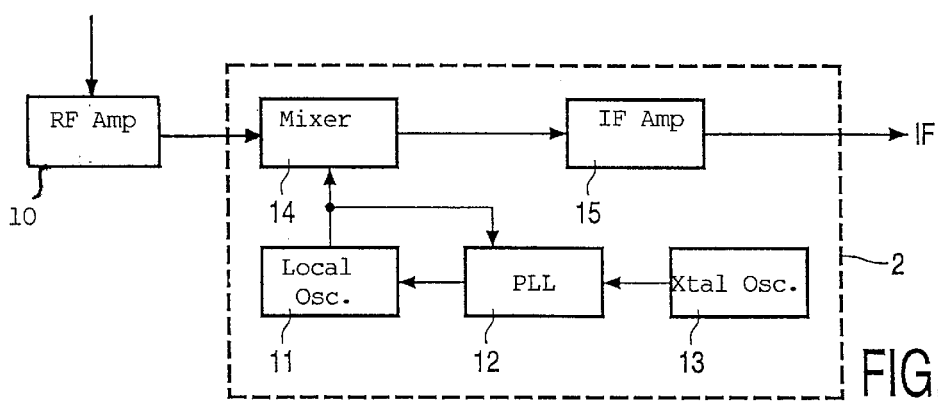
Figure 4:
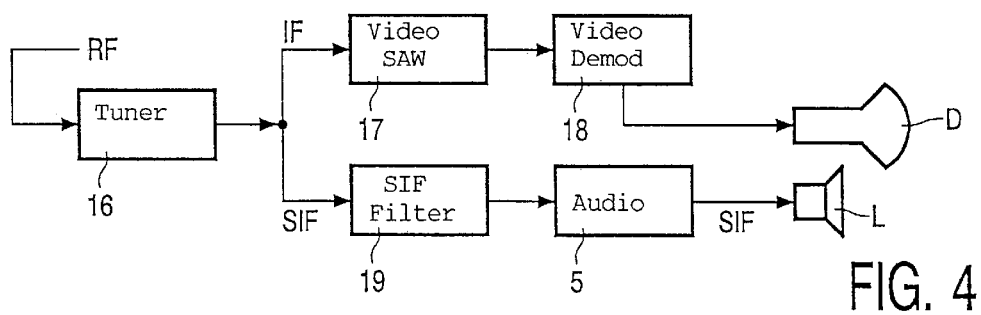
Figure 5:
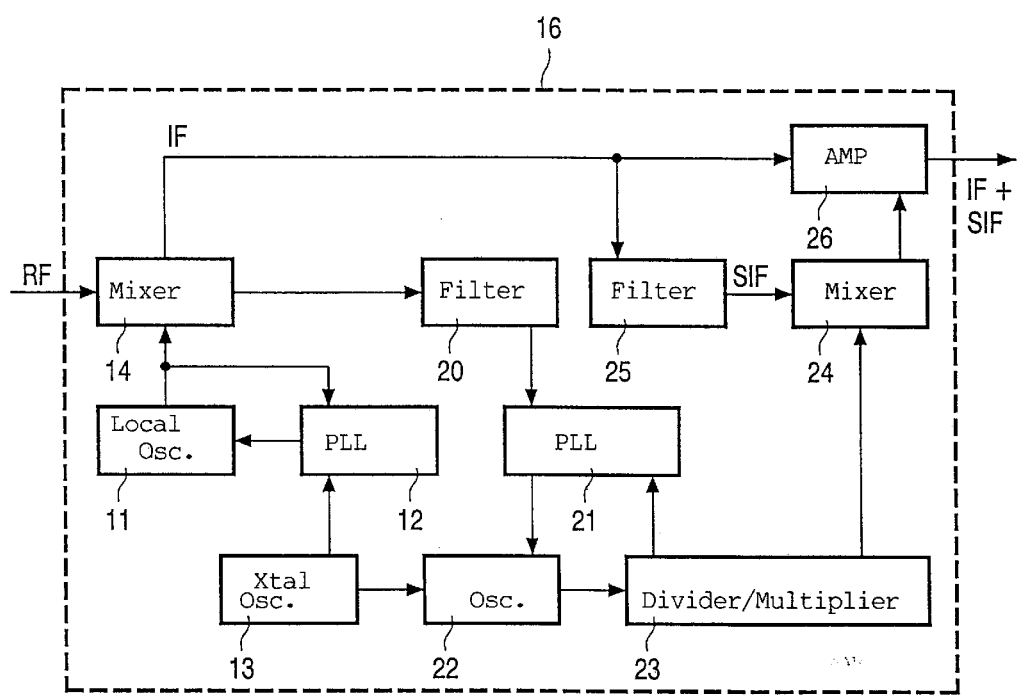

In the drawings:

FIG. 1 schematically shows a basic configuration for a television signal receiver according to the prior art;

FIG. 2 schematically shows a basic configuration of QSS SIF processing;

FIG. 3 schematically shows a basic configuration of a prior art tuner;

FIG. 4 schematically shows an embodiment of a television signal receiver according to the present invention, while FIG. 5 schematically shows the configuration of a tuner in the television receiver of FIG. 4 according to the present invention.

In the figures identical or similar components are designated with the same reference numbers.

In FIG. 1 a known television signal receiver is shown, where a conventional tuner is provided with a RF signal, which comprises modulated video signals and modulated audio signals. The tuner 2 in the television signal receiver 1 outputs an IF signal, as shown in FIG. 1, which IF signals are subsequently provided to a SAW filter and demodulator 3 of, in this example, the QSS SIF processing type, which is shown in FIG. 2. The SAW filter and demodulator 3 provides a demodulated video signal V for further video processing to a video processor 4, as well as a SIF signal for audio demodulator and sound processing block 5. The SIF signal comprises modulated audio signals on a carrier signal with a carrier frequency, which is equal to the difference between the carrier frequency for video and the carrier frequency for audio signals in the original television signal.

As shown in FIG. 2, the SAW filter and demodulator 3 in FIG. 1 comprises parallel processing paths; one for video and one for audio. The path for obtaining video signals from the IF signals comprises a video SAW filter 6, followed by a video demodulator 7, which optionally, but preferably, also comprises a video IF amplifier, preceding the actual demodulator. The video demodulator 7 provides demodulated video signals for the further video processing 4 in FIG. 1, but also a reference carrier Ref is sent to the path for audio.

In the path for audio processing of the SAW filter and demodulator 3 in FIG. 2, first an audio SAW filter 8 is provided, followed by an audio demodulator 9, which optionally, but preferably also comprises an audio IF amplifier preceding the actual demodulator. Using the reference carrier from the video demodulator 7, the audio demodulator 9 generates the SIF signals for the audio demodulator and processing block 5 in FIG. 1.

Because in the configuration of FIG. 2, the reference carrier is sent from the video demodulator 7 to the audio demodulator 9, the audio demodulator 9 can generate the SIF signals as modulated audio signals on a carrier with a frequency, which is equal to the difference between the frequency of the carrier of video signals and the frequency of the carrier for audio signals. As described above, the SIF signals are subsequently sent to the audio demodulator and processing block 5 in FIG. 1, where it is noted that the demodulator and processing block 5 preferably comprises a FM demodulator, as the audio signals are FM modulated.

The video and audio SAW filters 6, 8 preferably comprise an audio carrier attenuation and a video carrier attenuation, respectively, each of at least 30 dB. In this manner, the video path and the audio path in FIG. 2 can effectively be considered separate, except for the transfer of the reference frequency from the video demodulator 7 to the audio demodulator 9. Thus a high quality SIF signal can be obtained. However, in the configuration of the SAW filter and demodulator 3 of FIG. 2, separate video and audio SAW filters 6, 8 are required, whereby the costs of such a QSS SIF processing are high, in particular in relation to the intercarrier SIF processing, which requires only a single video and sound SAW filter, although the quality of the QSS SIF processing is increased in relation thereto.

The tuner 2 of FIG. 1 is shown in more detail in FIG. 3. In front of the tuner 2 optionally an input filter and a RF amplifier 10 can be arranged as a pre-processor for preprocessing RF signals from for instance an antenna or a cable network. Optionally, the RF signals may have been preprocessed by the preprocessor 10. The output of the local oscillator 11 is fed back to the PLL circuit 12 and also sent to a mixer 14, which then outputs the IF signals required for the SAW filter and demodulator 3 in FIG. 1, where the IF signals optionally, but preferably are amplified by IF amplifier 15 prior to being output to the SAW filter and demodulator 3.

The manner in which this tuner 2 and the components 11–15 thereof function is well known in the art, so that further description is omitted here.

FIG. 4 shows schematically a configuration of a television signal receiver according to the present invention. FIG. 5 shows a configuration of a novel tuner, employed in the configuration of FIG. 4.

In the television signal receiver of FIG. 4 the RF signal is introduced into a tuner 16 that is modified according to the present invention. The tuner 16 comprises a generator for supplying the SIF signals, as will be described hereafter. The output of tuner 16 therefore comprises the IF signals, primarily intended for obtaining the video signals, and the SIF signals, primarily for obtaining the audio signals.

The output of the tuner 16 is sent to a video SAW filter 17, which is preferably provided with a sound carrier attenuation of at least 30 dB, followed by a video demodulator 18 for obtaining the demodulated video signals therefrom, which are sent to a display unit D. The output of the tuner 16 is also sent to a SIF filter 19 for isolating the SIF signal from the output of the tuner 16, where the SIF signal is sent to the audio demodulator and processing block 5 of FIG. 1 for further audio processing. An output of audio processor 5 is applied to a loudspeaker L.

As will be appreciated by persons skilled in the art, using a generator for generating the SIF signals prior to processing by the SAW filter, a considerable simplification in relation to the configuration of FIG. 2 is achieved. The SIF filter can optionally and preferably be provided with a pre-amplifier. Although in the configuration of FIG. 4 and FIG. 5 the generator for generating the SIF signals is incorporated into the tuner 16, the present invention is not restricted thereto. A separate generator can be provided as well. It will also be evident, that the SIF signals are obtained without having to incorporate a separate audio SAW filter 8 as is the case in prior art according to FIG. 2. Thereby not only the costs for the television signal receiver, but also the complexity thereof are decreased, while still a high audio and also video quality are maintained.

The SIF filter 19 can have a pass band from 4.5 MHz to 6.5 MHz, which can be embodied accurately using cheap ceramic filters. In this relatively low frequency range amplification of the SIF signal can be realized using low cost transistors, etc.

In the tuner 16, as it is shown in more detail in FIG. 5, a conventional tuner 11–14, such as the one shown in FIG. 3, is incorporated. Additionally the tuner 16 comprises a narrow band filter 20 for isolating the IF video signals, which are then provided to a additional phase locked loop (PLL) circuit 21, which is connected in a loop with an oscillator 22 and a divider/multiplier 23. The oscillator 22 is connected to the crystal oscillator 13 of the conventional tuner configuration according to FIG. 3, whereas the divider/multiplier 23 has an output connected to a mixer 24, which receives an additional input from a filter 25 to output the SIF signal to an amplifier 26, which amplifies the IF signals and the SIF signals for output out of the tuner 16 thereof. The filter 25 receives the output of the mixer 14, so that the IF frequency of the video signals can be used to phase lock the oscillator 22, which is used to generate the SIF signals, which is required to maintain the frequency of the SIF signals constant, when the IF frequency of the video signals is changed during fine tuning. Because the generated IF frequency of the audio signals is fixed, the reference oscillation frequency can be generated using the crystal oscillator 13 of the tuner.

In the narrow band filter 20 the IF frequency of the video signals is filtered from the IF signal from the mixer 14. This filter 20 can be a fixed filter. In the divider/multiplier 23 the oscillation frequency required for generating the SIF signals is generated. Thru the PLL circuit 21 the output from the divider/multiplier 23 is phase locked to signals from the narrow band filter 20, so that the signal from the divider/multiplier 23 is phase locked to the IF signal of the video signals. Thus the oscillation frequency, which is sent by the divider/multiplier 23 to the mixer 24 can be equal to the difference between the IF frequency of the audio signals and the frequency of the SIF signals.

It will be clear to persons skilled in the art, that the tuner 16 is simply realized, as most components used therein are mixers, frequency dividers/multipliers, etc. No exceptionally expensive or sensitive components are used to obtain the SIF signals, whereby a simple and economical configuration for the television signal receiver is provided, which can supply SIF signals, by means of which high quality image and sound can be insured.

It will be clear to persons skilled in the art that the present invention is not limited to the specific embodiments described above and shown in the accompanying drawing.

Many modifications and alternatives are possible within the scope of the present invention, which is only restricted by the accompanying claims. It is for instance possible to provide a separate generator for the SIF signals apart from the tuner, in stead of the embodiment shown in FIG. 5. Further alternatives are equally possible. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A television signal receiver for receiving and processing television signals that comprise modulated video signals and modulated audio signals, the receiver comprising:
   a tuner for receiving selected television signals and furnishing at least intermediate frequency (IF) signals;
   a SAW filter connected to the tuner and a video demodulator for demodulating the video signals from the SAW filter to obtain demodulated video signals for further processing;
   a generator for supplying SIF signals comprising the modulated audio signals on a carrier frequency equal to the difference between a carrier frequency of the modulated video signals and a carrier frequency of the modulated audio signals in the television signals;
   an audio demodulator for demodulating audio signals from the SIF signals from the generator to obtain demodulated audio signals for further processing;
   means for generating a generator frequency signal having a frequency equal to a difference between the carrier frequency of the modulated audio signals and the carrier frequency of the SIF signals; and
   a mixer for mixing the IF signals with the generator frequency signal to produce the SIF signals,
   wherein the generator is connected with the tuner and wherein the audio demodulator is connected with the generator.

2. A television signal receiver for receiving and processing television signals that comprise modulated video signals and modulated audio signals, the receiver comprising:
   a tuner for receiving selected television signals and furnishing at least intermediate frequency (IF) signals;
   a SAW filter connected to the tuner and a video demodulator for demodulating the video signals from the SAW filter to obtain demodulated video signals for further processing;
   a generator for supplying SIF signals comprising the modulated audio signals on a carrier frequency equal to the difference between a carrier frequency of the modulated video signals and a carrier frequency of the modulated audio signals in the television signals;
   an audio demodulator for demodulating audio signals from the SIF signals from the generator to obtain demodulated audio signals for further processing; and
   an SIF filter disposed between the generator and the audio demodulator, wherein the SIF filter receives the IF signals and the SIF signals, isolates the SIF signals from the IF signals, and passes the SIF signals to the audio demodulator,
   wherein the generator is connected with the tuner and wherein the audio demodulator is connected with the generator.

3. A television signal receiver for receiving and processing television signals that comprise modulated video signals and modulated audio signals, the receiver comprising:
   a tuner for receiving selected television signals and furnishing at least intermediate frequency (IF) signals;
   a SAW filter connected to the tuner and a video demodulator for demodulating the video signals from the SAW filter to obtain demodulated video signals for further processing;
   a generator for supplying SIF signals comprising the modulated audio signals on a carrier frequency equal to the difference between a carrier frequency of the modulated video signals and a carrier frequency of the modulated audio signals in the television signals;
   an audio demodulator for demodulating audio signals from the SIF signals from the generator to obtain demodulated audio signals for further processing; and
   an amplifier receiving the IF signals from the tuner and the SIF signals from the generator, amplifying the IF signals and the SIF signals, and providing the IF signals and the SIF signals to the SAW filter,
   wherein the generator is connected with the tuner and wherein the audio demodulator is connected with the generator.

4. A television signal receiver for receiving and processing a television signal that comprises a modulated video signal and a modulated audio signal, the receiver comprising:
   a tuner for receiving a television signal and outputting an intermediate frequency (IF) signal including a video IF component having a video IF carrier frequency and an audio IF component having an audio IF carrier frequency;
   a video SAW filter receiving the IF signal, outputting the video IF component, and rejecting the audio IF component;
   a video demodulator for demodulating the video IF component output by the SAW filter to obtain a demodulated video signal;
   a generator receiving the IF signal and generating therefrom a sound intermediate frequency signal (SIF) signal comprising the modulated audio signal on a sound subcarrier frequency equal to a difference between the video IF carrier frequency and the audio IF carrier frequency; and
   an audio demodulator for demodulating the SIF signal to obtain a demodulated audio signal,
   wherein the generator comprises:
      means for generating a generator frequency signal having a frequency equal to a difference between the audio IF carrier frequency and the sound subcarrier frequency; and
      a mixer for mixing the IF signal with the generator frequency signal to produce the SIF signal.

5. The television signal receiver of claim 4, further comprising an SIF filter disposed between the generator and the audio demodulator, wherein the SIF filter receives the IF signal and the SIF signal, isolates the SIF signal from the IF signal, and passes the SIF signal to the audio demodulator.

6. The television signal receiver of claim 4, wherein the means far generating the generator frequency signal comprises:
   a filter receiving the IF signal from the tuner and outputting the video IF carrier frequency; and
   frequency generation means for receiving the video IF carrier frequency from the filter and producing therefrom the generator frequency signal phase locked to the video IF carrier frequency.

7. The television signal receiver of claim 4, wherein the frequency generation means includes an oscillator producing an oscillation frequency signal phase-locked to the video IF carrier frequency, and a divider/multiplier receiving the oscillation frequency signal and outputting the generator frequency signal phase locked to the video IF carrier frequency.

8. The television signal receiver of claim 4, further comprising an amplifier receiving the IF signal from the tuner and the SIF signal from the generator, amplifying the IF signal and the SIF signal, and providing the IF signal and the SIF signal to the video SAW filter.

9. The television signal receiver of claim 4, where there is no audio SAW filter in the receiver.

* * * * *